United States Patent

Froio

[15] 3,700,078

[45] Oct. 24, 1972

[54] SPEED RETARDING DEVICE

[72] Inventor: Nicholas J. Froio, Harvey, Ill.

[73] Assignee: Froio Corporation, Harvey, Ill.

[22] Filed: Nov. 23, 1970

[21] Appl. No.: 91,935

[52] U.S. Cl.................188/180, 188/187, 193/35 A
[51] Int. Cl............................B60t 8/00, B65g 13/00
[58] Field of Search.............188/180, 187; 193/35 A

[56] References Cited

UNITED STATES PATENTS

| | | |
|---|---|---|
| 1,021,347 | 3/1912 | Windhoff...............188/187 X |
| 445,144 | 1/1891 | Hunter....................188/187 X |
| 3,314,514 | 4/1967 | Hundhausen et al. ...193/35 A |

*Primary Examiner*—Evon C. Blunk
*Assistant Examiner*—W. Scott Carson
*Attorney*—Pendleton, Neuman, Williams & Anderson

[57] ABSTRACT

This device for retarding the movement of an object includes a rotatable member mounted for axial adjustment and biased to assume a predetermined axial position. The rotation of the member is responsive to the movement of the object being retarded. The rotatable member is provided with means for imparting an end thrust to the member upon rotation thereof, thereby causing the member to move from the predetermined axial position. The rotatable member carries one section of a sectional braking unit, and the one section is adapted to frictionally engage a stationary second section of the braking unit upon a predetermined thrust being applied to the member.

1 Claim, 7 Drawing Figures

3,700,078

PATENTED OCT 24 1972

INVENTOR
NICHOLAS J. FROIO
BY Pendleton Newman & ......Anderson
ATTORNEYS

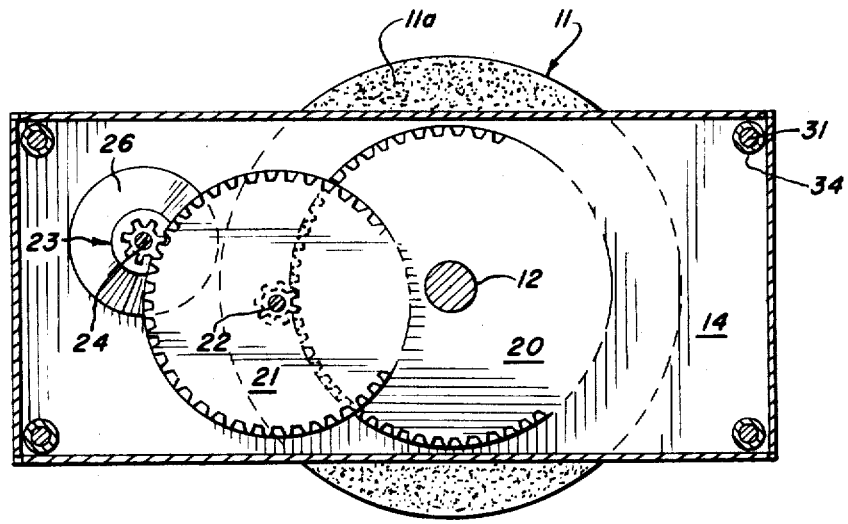
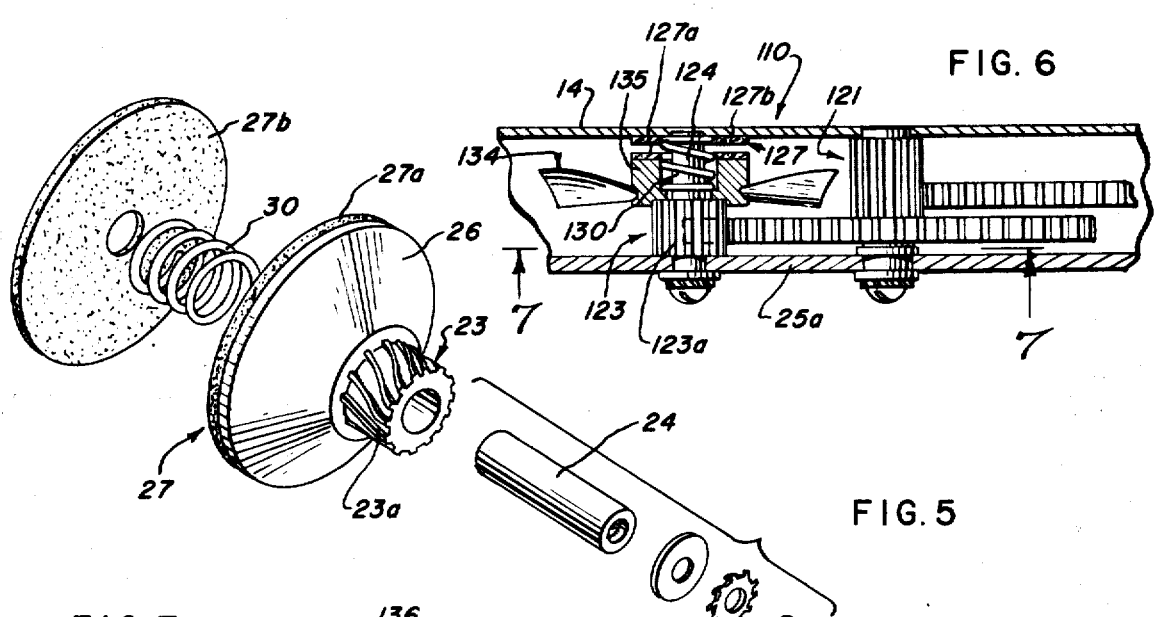
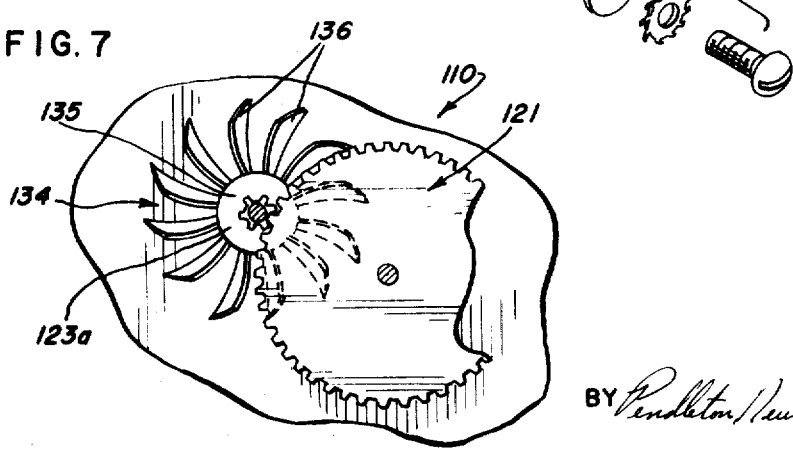
INVENTOR
NICHOLAS J. FROIO

3,700,078

SPEED RETARDING DEVICE

BACKGROUND OF THE INVENTION

1. Field of the Invention

This invention relates to a braking or retarding device which slows down or otherwise controls the speed of moving objects such as a pallet on a gravitationally-actuated conveyor system. More specifically, it relates to a low-cost, simplified braking device for conveyors and the like which does away with certain mechanisms associated with centrifugally-actuated brakes of the prior art and substitutes therefor a mechanism wherein braking forces are dependent on the rotationally-responsive axial movement of a terminal driven rotor.

While the present invention will be described with particular reference to embodiments designed primarily for braking or retarding objects gravitationally flowing on conveyor systems, it should be understood that the use of the invention is not limited thereto. It can be employed for braking, retarding, restraining, governing or otherwise controlling the movement of many other objects, including, for example, controlled-fall fire escape systems, automobile safety harnesses and belts, and the like.

2. Description of the Prior Art

Retarding the speed of a moving object, such as a pallet on a gravitationally-actuated conveyor ramp, oftentimes becomes an important mechanical operation which must be done effectively, as well as expeditiously. In material handling equipment, such as the aforementioned conveyor ramp or the like, it is frequently desirable, as well as important, that the forward motion of the article (package) along the ramp be slowed down when it reaches a predetermined station.

Heretofore, various mechanical devices have been provided to accomplish such a result. Typical are certain of the braking devices classified in Class 188, subclass 187 and Class 193, subclass 35 of the "Manual of Classification of Patents" of the U.S. Patent Office. Because of certain design characteristics, however, certain of these prior devices have been beset with one or more of the following shortcomings: (a) they were of bulky, complex, and costly construction; (b) they were difficult to service and maintain; and (c) they imparted a shock to, or marred the exterior of, the article being retarded by the device.

OBJECTS OF THE INVENTION

Thus, it is an object of this invention to provide a speed retarding device which avoids the aforenoted shortcomings of the prior devices.

It is a further object of this invention to provide a device which is compact and has a minimal number of component parts.

It is a still further object of this invention to provide a device which may be readily mounted on or adjacent a conveyor ramp or the like without requiring substantial disassembly or modification of said ramp.

It is a still further object of this invention to provide a device wherein the rate of retarding the speed of the object may be readily varied when desired.

Further and additional objects will appear from the description, accompanying drawings and appended claims.

SUMMARY OF THE INVENTION

In accordance with one embodiment of the invention, the device includes a rotatable first means which is driven by direct or indirect engagement with, or otherwise responsive to the movement of, the object; a rotatable second means in driving engagement with the first means; and a rotatable third means in driving engagement with the second means. The rotational speed of each successive means progressively increases as the first means is rotated by the object. The third means is mounted for axial adjustment relative to the second means upon rotation of said means.

A sectional braking unit is also provided having one section thereof carried by, and movable with, the third means, and a second section fixedly secured axially of said one section. Upon a predetermined rotational force or rotational speed being imparted to the third means, resulting in axial movement thereof, the braking unit sections will come into frictional engagement with one another. The extent of the frictional engagement between the braking unit sections is dependent upon the rotational force or speed and the axial movement of the third means, as will become apparent from the specific embodiments set forth in the drawings.

BRIEF DESCRIPTION OF THE DRAWINGS

For a more complete understanding of the invention, reference should be made to the drawings, wherein:

FIG. 4 is a sectional view taken along line 4—4 of FIG. 2;

FIG. 5 is a perspective, exploded view of the third means and the braking unit assembly, shown in FIG. 1;

FIG. 6 is similar to FIG. 3, but showing a modified form of the improved device; and FIG. 7 is a fragmentary sectional view taken along line 7—7 of FIG. 6.

Figure 1:
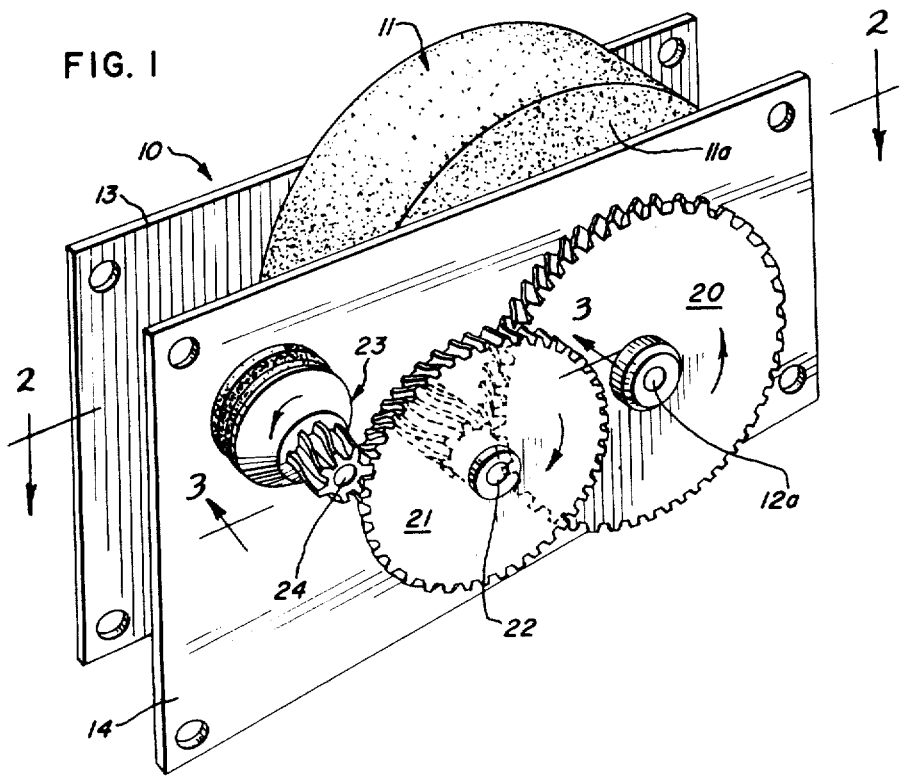
FIG. 1 is a fragmentary, top perspective view of one form of the improved device with a substantial part of the housing removed.

It should be understood that the specific embodiments illustrated in the drawings are not necessarily to scale and that certain portions thereof are represented by graphic symbols or have been omitted for simplicity of illustration. As a result, the representations may depart in certain respects from the actual appearance without detracting from the essential information communicated to those skilled in the art.

DETAILED DESCRIPTION OF THE DRAWINGS INCLUDING PREFERRED EMBODIMENT

Referring now to the drawings and more particularly to FIG. 1, one form of the improved device 10 is of a type which may be readily utilized in a conveyor ramp, not shown, over which bulky articles or packages pass. Ramps of the type in question are frequently employed when loading and unloading railroad freight cars, truck trailers and the like. It is to be understood, of course, that the improved device is not intended to be restricted to this particular installation but may be readily utilized in various other installations wherein the speed of an object is to be retarded.

Figure 2:
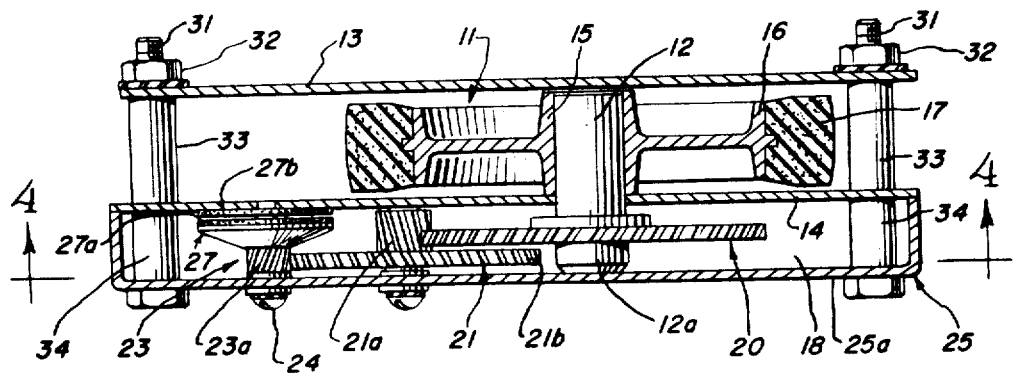
FIG. 2 is an enlarged sectional view taken along line 2—2 of FIG. 1.

As shown in FIGS. 1, 2 and 4, wheel or roller 11 is adapted to be keyed or otherwise secured to a rotating shaft 12. The shaft 12 is adapted to extend transversely of a pair of spaced, parallel plates 13 and 14. If desired, both plates may be provided with aligned openings through which the ends of the shaft extend and are supported by suitable bushings or bearings disposed within the openings.

The wheel 11, as shown in FIG. 2, includes a hub 15 which accommodates, and is keyed to, shaft 12; a rim portion 16; and an annular member 17 encompassing the rim portion. Member 17 may be formed of rubber or rubberlike material or have the exterior, arcuate surface thereof coated with a coarse material or roughened.

As seen in FIGS. 1 and 4, a circular segment 11a of the wheel 11 projects beyond the peripheries of the plates 13 and 14. When the device is disposed, preferably resiliently, in the path of a gravitationally-flowing article, the surface of the wheel is in frictional contact with the article and, as the article moves therepast, frictionally imparts a retarding force thereto, as will become apparent as the description proceeds.

One end 12a of shaft 12 terminates within a housing 18 (see FIG. 2) which will be described more fully hereafter. Keyed to shaft end 12a is a first gear 20 which is adapted to mesh with a toothed surface 21a formed on a compound or composite idler gear 21. Gear 21 is mounted within the housing for rotation about a shaft 22, the axis of which is parallel to and spaced from shaft 12. The second toothed surface 21b of gear 21 is of substantially greater diameter than surface 21a and the teeth thereof define a helical gear surface.

Surface 21b meshes with a toothed surface 23a formed on a third gear 23 mounted within the housing for rotation about a third shaft 24. Shaft 24 is disposed in spaced, parallel relation with respect to shafts 12 and 22. The teeth on surface 23a form a mating helical gear for gear surface 21b.

As is characteristic of helical gears, an end thrust is developed between the meshing helical gears and the amount of end thrust produced is dependent upon the helix angle of the meshing teeth. The helix angle is normally defined as the angle, at the pitch line of the helix, of the tooth with the center line of the gear. As an alternative, the helix angle is frequently defined as the angle of departure of the helix from a spur gear. The helix angle utilized in the meshing surfaces 21b and 23a may range from 10° to 45°. It is the end thrust characteristic of helical gears which is utilized in the device 10, shown in FIGS. 1–4, to effectuate the desired retardation of wheel 11. The faster the gear train and the third gear 23 rotate, the greater the forces on toothed surface 23a and the greater the end thrust and consequent retarding forces.

Gear 21, which functions as an idler, is prevented from moving axially by plate 14 and a cover piece 25, the latter forming a part of housing 18. Gear 23, on the other hand, is mounted so that it will move axially along shaft 24 as an end thrust is applied thereto.

Figure 3:
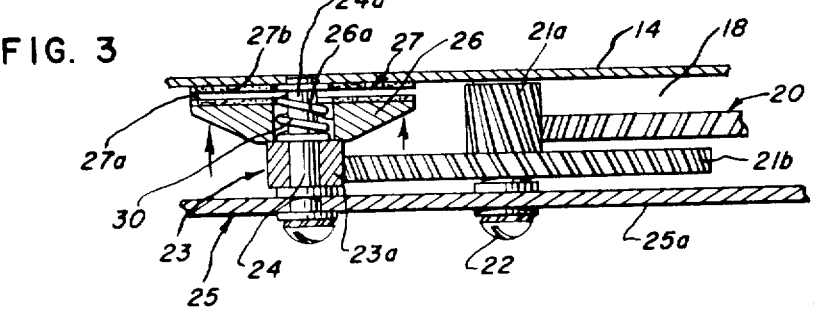
FIG. 3 is an enlarged fragmentary sectional view taken along line 3—3 of FIG. 1.

As will be noted in FIGS. 3 and 5, gear 23 is provided at one end with an enlarged annular end piece 26 which may be made integral with gear 23 or fixedly secured thereto. The enlarged end face of piece 26 carries thereon one section 27a of a sectional braking unit 27.

Section 27a may be a coating of coarse material applied thereto or may be produced by causing the end face to be roughened by any suitable means. The type of braking surface is well within the skill of the art in the light of the present disclosure.

Disposed axially of section 27a is the second section 27b of the braking unit 27 which may comprise an annular lamina of coarse material or other braking material affixed to the adjacent surface of plate 14. In lieu of the lamina, the surface of the plate may be roughened by any suitable means. In any event, the surface 27b must be compatible with the surface 27a to achieve desired braking characteristics when the two surfaces engage.

The end face of piece 26, as seen in FIG. 3, is provided with a countersunk center bore 26a adapted to accommodate one end of a coil spring 30 which encompasses the adjacent end 24a of the shaft 24. The opposite end of the spring 30 resiliently engages an aligned portion of plate 14 and causes gear 23 and end piece 26 to be biased as a unit away from plate 14 whereby the braking unit sections 27a and 27b assume a disengaged relation, as seen in FIG. 3. The bias exerted by the spring 30, however, is such that it may be readily overcome by the end thrust produced by the rotating helical gears 21 and 23.

The housing 18 is defined by plate 14 and cover piece 25, the latter being secured to the plate by a plurality of bolts 31. Each bolt extends through suitable openings formed in the cover piece, plate 14, and plate 13. A nut 32 is threaded onto the leading end of the bolt so as to retain the plate 14 and cover piece 25 in assembled relation. The shank of each bolt is encompassed by a pair of spacer sleeves 33 and 34. Sleeve 33 is positioned between plates 13 and 14, and sleeve 34 is positioned between plate 14 and one wall 25a of the cover piece 25, thereby providing the proper spacing for the wheel 11 and the various gear components. The cover piece 25, when in place, conceals gear components and protects same against dirt or foreign matter. To replace or service the various components of the device merely requires removal of the cover piece or plates.

As will be apparent from the disclosure, gear 20 and meshing gear surface 21a need not be of helical configuration but may be of herringbone configuration or conventional spur gear design. Helical gears, however, are usually quieter than spur gears. Also, the reaction end thrust on gear 21 may be utilized for braking purposes in the same manner as the end thrust on gear 23. In such case, gear 21 would be spring-biased away from wall 25a of cover piece 25 and complementary braking surfaces would be installed on gear 21 and on the wall 25a.

All end thrust on gear 21 could be eliminated by making surface 21b into a herringbone configuration which would drive a non-integral pair of helical gears on shaft 24, one with a lift-hand lead of helix and the other with a right-hand lead of helix. If desired, two pairs of braking surfaces rather than one may then be employed with the two helical gears being oppositely biased towards each other on the same shaft, the brake pairs being "mirror images" of each other.

FIGS. 6 and 7 show a modified device 110 wherein gears 21 and 23 have been replaced by gears 121 and 123. The meshing surfaces of gears 121 and 123 may be of conventional spur gear configuration. Gear 123, as in the case of gear 23, is mounted for axial movement along shaft 124. Axial adjustment of gear 123 towards plate 14, however, is accomplished by a propeller assembly 134 mounted on an extension 135 formed at one end of the toothed surface 123a of the gear.

The propeller assembly 134 comprises a plurality of symmetrically arranged outwardly projecting blades 136. The pitch of the blades is such that an axial thrust towards plate 14 is created as the gear is rotated. Affixed to the end face of the extension 135 is one section 127a of a sectional braking unit 127. The other, or complemental, section 127b of the unit is affixed to the adjacent surface of plate 14. A biasing spring 130, similar to spring 30, is provided to cause the braking unit sections to normally assume a disengaged relation, as seen in FIG. 6. In addition to producing the necessary end thrust, the propeller assembly 134 functions to produce a cooling effect for the braking unit 127 by causing a stream of air to flow thereacross.

In both of the illustrated devices 10 and 110, the gear ratios between the various meshing gears is such that the speed of rotation is progressively increased with each successive gear. By reason of this fact, therefore, the braking unit in either case is quite sensitive to any retarding forces exerted on the terminal gear.

While the rotational speed of the object has heretofore been described as being transmitted through a gear train, it is to be understood, of course, that the invention is not limited thereto. Manifestly, frictional contacting surfaces, chain and sprocket, belt and pulley, rack and pawl, or combination of same, may be substituted for gear 20 and gear surface 21a.

Thus, it will be seen that a simple and compact device has been provided which is adapted to effectively retard the speed of moving objects and which may be easily serviced and maintained. The improved device may be readily installed on or adjacent a conveyor ramp or the like without requiring substantial disassembly of the latter.

From the above description and drawings, it is apparent that the objects of the present invention have been achieved. While only certain embodiments have been described or illustrated, many alternative modifications and equivalents will be apparent from the above description to those skilled in the art.

For example, auxiliary braking action may be achieved in the illustrated embodiments of the present invention by adjusting the biasing force exerted by spring 30 of FIGS. 1–5 or by spring 130 of FIGS. 6–7. In each case the frictional drag or resistance to rotation imparted by the respective spring forces against the rotating member provides an initial braking action which can substitute for or supplement that encountered when the respective braking surfaces 27a–27b and 127a–127b come into contact. As those skilled in the art will recognize, the more the respective springs are compressed by axial shifting of the helical gears the greater the retarding force of the spring.

As another example, while braking units 27 and 127 are shown with two opposed braking surfaces 27a–27b and 127a–127b respectively, only one surface of each, e.g., 27a and 127a, need have a braking surface. The opposed surface can merely be the contacting portion of plate 14.

These and other alternatives and equivalents are considered within the spirit and scope of the present invention and coverage thereof is intended by the claims of any patents based on this application and any continuations or divisions thereof, even though not necessarily encompassed by the strict verbiage thereof.

Having described the invention, what is claimed is:

1. A speed retarding device comprising first means mounted for rotation about a fixed axis, said first means having a first portion for applying thereto an external rotating force and a second portion positioned axially of and rotatable with said first portion; second means mounted for rotation about a fixed second axis spaced from said first axis, said first and second means being in driving engagement with one another; third means mounted for rotation about a third axis spaced from said second axis and in driving engagement with said second means, said third means being biased axially to assume a predetermined normal position, a propeller assembly mounted on the exterior of said third means and provided with a plurality of symmetrically arranged blades having a pitch whereby a thrust is imparted to said third means to effect axial movement thereof overcoming said bias upon said third means being rotated at a predetermined speed in one direction; and a sectional braking unit having a first complemental section carried by and rotatable with said third means as a unit, and a relatively fixed second complemental section positioned in axially spaced relation with said first complemental section when said third means is in said predetermined normal position; said complemental sections being in frictional engagement with one another upon said third means being rotated by said second means in said one direction at said predetermined speed.

* * * * *

UNITED STATES PATENT OFFICE
CERTIFICATE OF CORRECTION

Patent No. 3,700,078        Dated October 24, 1972

Inventor(s) Nicholas J. Froio

It is certified that error appears in the above-identified patent and that said Letters Patent are hereby corrected as shown below:

Column 4, line 60, change "lift-hand" to --left-hand--.

Column 6, line 25, before "axis" insert --first--.

Signed and sealed this 13th day of March 1973.

(SEAL)
Attest:

EDWARD M. FLETCHER, JR.
Attesting Officer

ROBERT GOTTSCHALK
Commissioner of Patents